United States Patent Office 3,278,243
Patented Oct. 11, 1966

3,278,243
FLUID PRESSURE OPERATED BRAKING
SYSTEMS FOR VEHICLES
Frank Radcliffe Mortimer, Styvechale, Coventry, England,
William Harold Bent, Wantirna, Victoria, Australia, and
Glyn Phillip Reginald Farr, Kenilworth, England, assignors to Dunlop Rubber Company Limited, London,
England, a corporation of Great Britain
Filed Feb. 12, 1964, Ser. No. 344,352
Claims priority, application Great Britain, Feb. 23, 1963,
7,375/63
10 Claims. (Cl. 303—21)

This invention relates to fluid pressure operated braking systems for vehicles, for example aircraft braking systems.

Aircraft braking systems often include anti-skid mechanisms for releasing the brakes whenever the condition of the runway and the braking pressure applied is such as to cause the wheels to lock. An anti-skid mechanism may comprise a skid-sensing device in the form of a flywheel which is driven by, and rotates at the same speed as, a wheel with which it is associated, and which will tend to "overrun" the wheel when the wheel is braked. A cam mechanism associated with the flywheel and the braked wheel operates a valve to release pressure from the brake-applying mechanism of the wheel whenever the rate of retardation of the wheel exceeds a predetermined value. The tendency for a wheel to lock when subjected to heavy braking on a slippery runway is thus largely avoided.

The system just described has to be provided with a restrictor to reduce the rate at which pressurised fluid is supplied to the brake-applying mechanism during the operation of the anti-skid device. Otherwise as soon as the skidding condition is overcome, fluid would be rapidly supplied to the brake-applying mechanism to apply the full braking pressure and thus to cause the wheel to lock before the anti-skid device had time to operate again. The flow of fluid to the brake-applying mechanism after the anti-skid device has operated is therefore restricted so that the build-up of pressure is gradual, and the anti-skid device thus has time to operate to release the braking pressure before the next skid occurs.

In order to allow the braking pressure to be quickly applied following the initial actuation of the system by the pilot, while also providing for a restricted flow of fluid during the period in which the anti-skid device is operating, it is usual to restrict the flow of fluid to the brake by means of a "modulator," that is, a cylinder containing a plunger which has a restricted passage for allowing fluid to pass through the plunger. The inlet end of the cylinder is connected to means for supplying pressurised fluid and the outlet end is connected to the brake-applying mechanism, the arrangement being such that initial pressurisation of the system forces the plunger against a return spring until the plunger reaches the outlet end of the cylinder. During the initial movement of the plunger, fluid is displaced rapidly to the brake-applying mechanism, but as soon as the plunger reaches the outlet end of the cylinder the flow of fluid has to pass through the restricted passage in the plunger. The anti-skid device is then able to operate more effectively, since only a restricted flow of fluid can reach the brake-applying mechanism. An important feature of the present invention is that the anti-skid device can exhaust fluid from the brake applying lines by interrupting the unrestricted flow to the brakes. The anti-skid device operates on the principle of either providing a restricted or an unrestricted flow of fluid to a brake-applying mechanism and by either supplying or interrupting the supply of pressure fluid to the brake-applying mechanism there is effected an anti-skid operation.

A further problem exists, however, in that when an aircraft lands, for example, on an ice-covered runway the initial application of the brake may cause an immediate skid, and the skid-sensing device thus has to operate during the initial period of application, when a relatively free flow of fluid is passing to the brake-applying mechanism. As explained above, this reduces the efficiency of the anti-skid device.

One object of the present invention is to provide a fluid pressure operated braking system, comprising an anti-skid device, in which the efficiency of the anti-skid device during the period of initial application of the brakes is improved, compared with the efficiency of the anti-skid device in the conventional system described above.

According to the invention, a fluid pressure operated braking system comprises a brake-applying mechanism, means for supplying a substantially unrestricted flow of pressurised fluid to the brake-applying mechanism, an anti-skid device for releasing fluid from the brake-applying mechanism, and valve means for interrupting the substantially unrestricted flow of fluid to the brake-applying mechanism, the valve means being arranged to operate to interrupt the unrestricted flow immediately upon operation of the anti-skid device and thereafter to permit a restricted flow of fluid to the brake-applying mechanism so that re-application of the brake by the restricted flow of fluid commences immediately upon cessation of the release of fluid from the brake-applying mechanism by the anti-skid device.

The effect of providing means to interrupt the unrestricted flow immediately upon operation of the anti-skid device ensures that the brakes are not re-applied with undue force following the first action of the anti-skid device, thus providing improved braking in the early stages of the landing run.

Preferably, a fluid pressure operated braking system in accordance with the invention comprises a brake-applying mechanism, means for supplying a substantially unrestricted flow of pressurised fluid to the brake-applying mechanism, an anti-skid device for releasing fluid from the brake-applying mechanism, a restrictor for restricting the flow of fluid to the brake-applying mechanism, and valve means for interrupting the unrestricted flow of fluid to the brake-applying mechanism, the valve means being arranged to operate to interrupt the unrestricted flow immediately upon operation of the anti-skid device and thereafter to divert the flow of fluid through the restrictor to the brake-applying mechanism so that re-application of the brake by the restricted flow of fluid commences immediately upon the cessation of the release of fluid from the brake-applying mechanism by the anti-skid device.

The invention also provides a restrictor assembly for incorporation in a fluid pressure operated braking system which includes a brake, a brake-applying mechanism, means for supplying a substantially unrestricted flow of pressurised fluid to the brake-applying mechanism and an anti-skid device for releasing fluid pressure from the brake-applying mechanism, the restrictor assembly comprising a valve and a restrictor arranged so that the valve will operate immediately upon release of fluid from the brake-applying mechanism by the anti-skid device to interrupt the substantially unrestricted flow of pressurized fluid to the brake-applying mechanism and thereafter to permit fluid to flow to the brake-applying mechanism through the restrictor to provide a gradual re-application of the brake which commences immediately upon the anti-skid device ceasing to release fluid from the brake-applying mechanism.

When a runway is dry, and has a good surface, the wheels of a landing aircraft will not skid so readily, and the anti-skid device will not therefore be required to operate so frequently as in the case of a wet or ice-covered runway. Under these conditions it is more important that the pressure in the brake-applying mechanism should be re-established quickly after each operation of the anti-skid unit than that the pressure should be allowed to drop quickly when the anti-skid device operates. On a wet or ice-covered runway, on the other hand, the reacceleration of the wheel after each operation of the anti-skid device is slow, and the brake pressure thus needs to be applied more gradually.

According to a further feature of the invention, the restrictor is of a form in which the restricting effect is variable in inverse proportion to the pressure of fluid supplied by it to the brake-applying mechanism. When a restrictor of this form is used, the rate at which fluid is supplied to the brake-applying mechanism after each operation of the anti-skid unit to release the brake is governed by the maximum pressure which is set up in the brake-applying mechanism before the operation of the anti-skid device. Thus in the case of a runway having a good surface the maximum pressure set up in the brake-applying mechanism before the anti-skid device operates is relatively high, and the restricting effect on the subsequent supply of fluid is reduced.

One embodiment of the invention will now be described, first in outline and then in more detail, with reference to the accompanying drawings, in which:

FIGURE 3 is an end view of the assembly shown in FIGURE 2.

Figure 1:
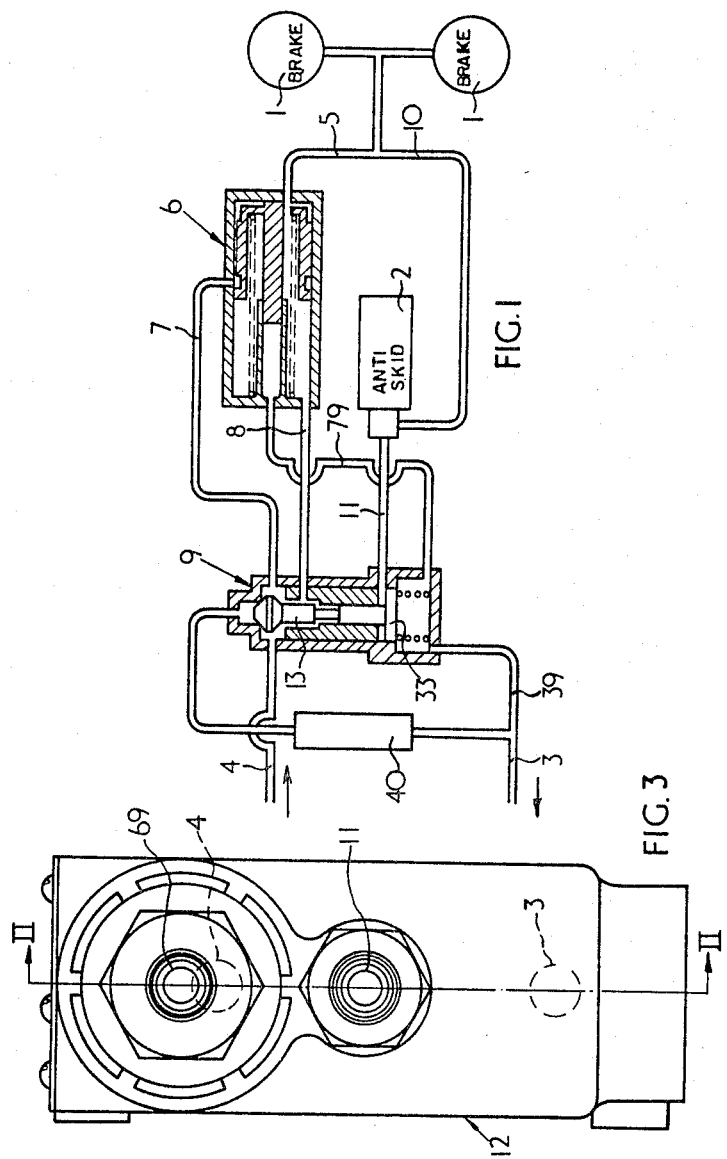
FIGURE 1 is a diagrammatic representation of an aircraft braking system.

The brake-applying mechanism 1 of each braked wheel of the aircraft braking system shown in FIGURE 1 is provided with a rotary-inertia anti-skid device 2 for releasing the pressure from the brake-applying mechanism when the rate of retardation of the wheel rises above a predetermined value. The released fluid is returned to a fluid reservoir (not shown) through exhaust outlet 3.

Fluid is supplied to the brake-applying mechanism 1 in the conventional manner through inlet 4 from a source of fluid pressure (not shown) via a control valve (also not shown) operated by the pilot. Before the fluid reaches the brake mechanism 1, through a connecting pipe 5, it is passed through a restrictor unit 6 comprising a restricted passage 7 and a relatively unrestricted passage 8. A two-position cut-off valve 9 is arranged so that in one position it allows fluid to flow to the brake through both the restricted and the unrestricted passages of the restrictor unit, and in the other position the unrestricted passage is closed, thus forcing the fluid to pass through the restricted passage only. The cut-off valve is arranged to be actuated by the pressure of fluid released from the brake through pipes 10 and 11 by the anti-skid device 2, to close the unrestricted passage whenever the anti-skid device operates and thus to restrict the flow of fluid to the brake. Both the cut-off valve and the restrictor unit are mounted in a housing 12 (see FIGURES 2 and 3) which is located adjacent to the brake.

The system will now be described in greater detail.

The cut-off valve 9 comprises a valve member 13 located in a bore 14 of the housing, the member 13 having a stem 15 and a head 16 formed with a frusto-conical seating surface 17 for sealing engagement with a valve seat 18 formed in an annular member 19 fluid-tightly inserted in one end of the bore 14.

A second valve seat 20 is formed on the end of a tubular member 21 inserted into the bore 14 from the opposite end, and a second frusto-conical seating surface 22 is formed on the reverse side of the head 16 of the valve member 13 for sealing engagement with the valve seat 20. The valve member 13 is freely movable in the axial direction of the bore so that its head can be brought alternatively into engagement with either of the valve seats 18 and 20.

The space between the valve seats 18 and 20 constitutes an annular chamber 23 which surrounds the valve member and is connected to the inlet 4 by a passage 24, through an opening 25. The passage 24 communicates directly, through a passage 26, with the relatively restricted passage 7 of the restrictor unit 6, which is thus in constant communication with the supply of pressurised fluid.

The valve stem 15 passes coaxially through the tubular member 21 and comprises three integrally-formed cylindrical portions, the central portion being of reduced diameter, the portion 27 adjacent the head and the tail portion 28 being of equal diameters. The part of the tubular member adjacent its valve seat 20 is provided with an outlet 29 which is connected, by a passage 30, to the relatively unrestricted passage 8 formed in the restrictor unit 6.

At an annular shoulder 31 formed beyond the outlet to the relatively unrestricted passage, the internal diameter of the tubular member 21 is reduced to a size which provides a fluid-tight sliding fit for the tail end 28 of the valve stem, and which is also fluid-tightly engageable by the portion 27 of the valve stem.

A second outlet 32 is formed in the wall of the tubular member 21 for use in an alternative housing construction (not shown). By suitably modifying the housing, the outlet 32 would, in the alternative construction, communicate with the relatively unrestricted passage of a second restrictor unit (not included in the construction illustrated), for operation with a second brake, where two brakes are required to be operated from a single pressure line. The restricted passage of the second restrictor unit would be in continuous communication with the annular chamber 23. Where this alternative arrangement is used, the shoulder 31 formed in the wall of the tubular member 21 co-operates with the portion 27 of the valve stem to isolate the unrestricted passages of the two restrictor units from one another when the valve member is positioned against the valve seat on the tubular member to cut off the unrestricted passages from the supply.

The tail end 28 of the valve stem projects through the end of the tubular member 21 and is attached coaxially to a disc-shaped valve 33 which is lightly spring-loaded by a compression spring 34 into sealing engagement with the bore of an annular insert 35 fluid-tightly fitted in the bore 14. The valve disc 33, when located in the bore of the insert 35, isolates a cylindrical chamber 36 surrounding the tail of the valve stem from a cylindrical cavity 37 formed in the housing.

A passage 38 from the anti-skid device exhaust line 11 is connected to the chamber 36 and the exhaust outlet 3 is connected to the cylindrical cavity 37 by a passage 39.

A bore 40, sealed at one end by an insert 41 which extends through the bore and contains a passageway 42 is connected to a space 43 within the annular member 19 by a passage 44. The purpose of the bore 40 is to allow any pressure which may build up within the space 43 while the valve member 13 is seated, as shown in FIG- URE 2, to be dissipated by leakage, through a restricted outlet, to the fluid reservoir. In order to prevent undue leakage when the valve member is unseated from the valve seat 18 a plunger 45 is provided in the bore 40, the plunger 45 having an integral valve member 46 for engagement with a valve seat 47, formed on a tubular insert 48 fluid-tightly fitted in the bore 40. The plunger 45 is normally urged to the position illustrated in FIGURE 2 by a spring 49: in this position fluid leaking past valve seat 18 can flow through a bore 50 in the plunger and restricted openings 51 in the plunger, and through the insert 48 to exhaust. When the pressure in passageway 42 rises above a predetermined value, the openings 51 provide sufficient restricting effect to enable the pressure in the passageway to the retained and to move the plunger 45 against the spring 49 to bring the valve member 46 into engagement with its seat 47 to prevent further escape of fluid.

The operation of the cut-off valve is as follows.

In the normal state of operation of the system, that is when the anti-skid device 2 is not operating to release fluid from the brake-applying mechanism 1, the head 16 of the valve member 13 is seated on the valve seat 18. The valve member 13 is held in this position by the spring 34 loading the valve disc 33 attached to the tail of the stem of the valve member, and by the effect of differential pressure within the annular chamber 23 acting on a greater area on the surface 22 than on the surface 17 which is seated on the valve seat 18. Only the annular area of the head of the valve member which lies outside the valve seat 18 is subjected to the full pressure within the annular chamber 23, since the pressure in the space 43 is kept to a low value by leakage through the bore 40 as described above.

Figure 2:
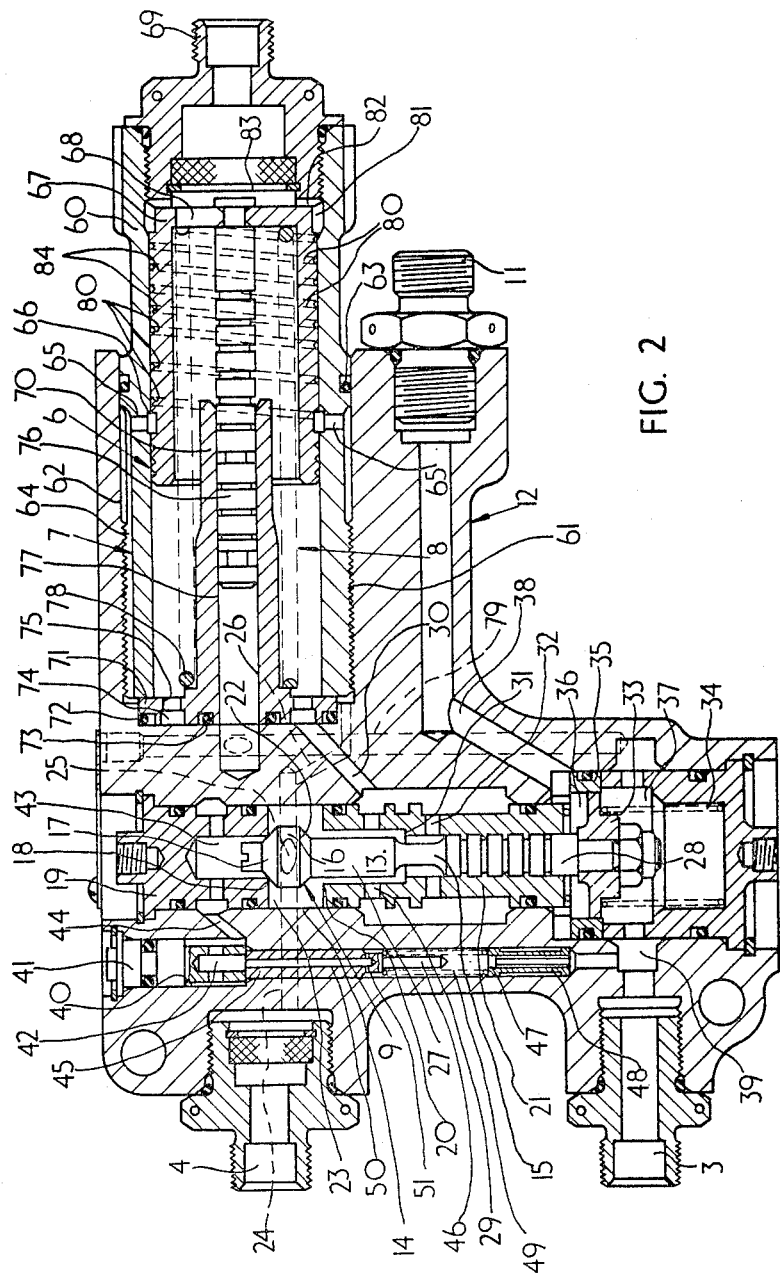
FIGURE 2 is a cross-sectional view, taken on the line II—II of FIGURE 3, showing a restrictor assembly comprising a cut-off valve and a restrictor unit forming part of the aircraft braking system shown in FIGURE 1.

When the valve member is in the position shown in FIGURE 2, the pressurised fluid can flow through both the restricted passage 7 and the relatively unrestricted passage 8 of the restrictor unit 6 to the brake-applying mechanism. If conditions are such as to cause a tendency for the wheel to lock, the anti-skid device 2 operates to release fluid from the brake-applying mechanism, the released fluid flowing through the passage 38 into the chamber 36, unseating the valve disc 33 and passing the cylindrical cavity 37, to the reservoir through the outlet 3. The action of unseating the valve disc 33 pulls the valve member 13 away from its seating 18 on the annular member 19.

As soon as the head of the valve member 13 is unseated from the annular member 19, it is subjected to full fluid pressure over the whole of its surface, the fluid-tight sliding engagement of the tail portion 28 with the bore of the member 21 causing a pressure differential which moves the valve member axially until it seats on the second valve seat 20. This effectively blocks the outlet 29 to the relatively unrestricted passage 8 of the restrictor unit 6. The valve member remains in this position until the pilot operates his control valve to release the pressure from the fluid system or, until the anti-skid operates to relieve pressure in cylindrical chamber 36, enabling the spring 34 to reposition the valve. When the valve member 13 is repositioned, it will permit fluid to flow from the inlet 4 to the unrestricted passage 8, to the brake mechanism.

The restrictor unit 6 comprises a hollow cylinder 60 which is provided on its outer surface with a screw thread 61 to enable it to be screwed into a blind cylindrical screw-threaded bore 62 of the housing. The cylinder 60 is provided with a sealing ring 63 between the side wall of the cylinder and the open end of the bore.

The outlet from the annular chamber 23 of the cut-off valve communicates via passage 26 with axially-extending flutes 64 formed in the wall of the cylinder 60, which lead through radial drillings 65 into an annular recess 66, in the inner wall of the cylinder 60, which constitutes an inlet to the cylinder.

The outlet passage 30 from the tubular member of the cut-off valve leads to the blind end of the cylindrical bore 62, and communicates with the unrestricted passage 8 which is formed by the interior of the cylinder 60 and the interior of a hollow piston 67 slidable therein, an aperture 68 being provided in the piston crown to enable the fluid to pass to the brake-applying mechanism 1 through the connecting pipe 5 (see FIGURE 1) which is fixed to a connector 69 fluid-tightly secured to the cylinder 60. The cylinder 60 contains a flanged tubular member 70, the flange 71 of the member 70 being trapped between the end of the cylinder 60 and the end of the blind bore 62 and being provided with sealing rings 72 and 73 fluid-tightly engaged between the flange 71 and the end face of the bore 62. An annular groove 74 and axial drillings 75 in the flange 71 constitute a second inlet, to connect the interior of the cylinder 60 to the passage 30. A cylindrical plunger 76 is fluid-tightly slidable within a cylindrical bore 77 in the tubular member 70 and is fixed coaxially within the skirt of the hollow piston 67, which is urged away from the blind end of the cylindrical bore 62 by a coiled return spring 78 located around the tubular member. The bore 77 is connected by a passage 79 with the cylindrical cavity 37, and is thus permanently connected to the exhaust outlet 3.

The outer cylinder surface of the piston 67 is provided with a helically-extending groove 80 which communicates at one end with the outlet through the connector 69 via a recess 81 in the cylinder 60 and radial notches 82 in the connector. The groove 80 communicates, at a point along the side of the piston 67, with the annular recess 66 formed in the inner wall of the cylinder 60, thus forming a restricted passage through which fluid can pass from the annular recess 66 to the outlet end 83 of the cylinder 60 and thus to the brake-applying mechanism, along the groove 80. The length of the restricted passage depends on the position on the piston at which the helical groove 80 meets the annular recess 66 in the cylinder wall, and thus the amount of restriction imposed on the flow of fluid varies according to the position of the piston, the restriction decreasing as the piston moves towards the blind end of the cylindrical bore because of the reduction in the length of the continuous groove 80 through which the fluid has to flow. A second helical groove 84 concentric with the groove 80 is also provided in the piston, extending from the piston crown between the convolutions of the groove 80 for part of the length thereof. The groove 84 provides an additional path by which fluid can pass to the outlet, when the end of this groove meets the recess 66, and thus gives a non-linear decrease in the restriction offered as the piston is moved towards the blind end of the bore 62.

When the cut-off valve 9 operates to close the passage 8 which leads directly to the outlet to the brake-applying mechanism, fluid is forced to flow through the helical grooves around the piston to the outlet end 83.

The pressure set up in the outlet end 83 of the cylinder acts on a larger area on the outside of the piston crown than on the inside, since the effective area of the inner surface of the piston is reduced by the plunger 76, which is exposed only to the pressure within the tubular member 70, which is connected to exhaust.

The effect of an increase in pressure in the fluid contained in the restrictor unit 6, therefore, is to cause the piston to be moved towards the blind end of the bore until the net resultant pressure on the piston crown is balanced by the force exerted by the compressed return spring 78. Thus when a relatively low pressure is set up in the brake-applying mechanism 1 before the anti-skid device operates, the piston 67 does not move very far towards the blind end of the bore and a relatively high restriction is imposed on the flow of fluid. On an ice-covered runway the anti-skid device will operate almost as soon as the brakes are applied, when a low pressure will have been set up in the brake-applying mechanism.

When the aircraft lands on a dry runway the pressure set up in the brake-applying mechanism 1 before the first operation of the anti-skid device 2 reaches a relatively higher value, and thus the piston of the restrictor unit moves nearer towards the blind end of the bore. This effectively shortens the helical groove 80, or grooves 80 and 84, through which fluid has to pass to the brake after operation of the cut-off valve 9. Under these conditions the restriction imposed on the flow of fluid is less and the brake-applying mechanism will operate more rapidly to re-apply the brakes after each operation of the anti-skid device.

When the anti-skid device first operates, the cut-off valve closes the relatively unrestricted passage 8 to the brake-applying mechanism. The effect of closing the unrestricted passage is to render subsequent changes in pressure in the restrictor unit more gradual, and thus the position of the piston 67 does not change to any great extent between consecutive operations of the anti-skid device. Subsequent operations of the anti-skid device may cause the position of the piston to alter gradually, so that when the aircraft speed is reduced towards the end of its landing run the pressure at which the anti-skid device operates will have increased and the piston 67 will have moved to a new position in which relatively less restriction is offered to the flow of fluid.

The characteristics of the restrictor unit described above enable the braking system automatically to adjust itself to provide a gradual re-application of braking pressure on an ice-covered runway and a more rapid re-application of the brakes on a dry runway. The position of the piston 67 of the restrictor unit 6 depends on the maximum pressure set up in the brake-applying mechanism 1 before the anti-skid device 2 operates, and this pressure is itself dependent on the frictional co-efficient of the runway.

No intervention by the pilot is required since the piston of the restrictor unit will automatically stop in the appropriate position whatever pressure is initially applied to the fluid in the braking system: it is not necessary for the pilot to vary the setting of his control valve according to the condition of the runway. The control valve can be set to provide maximum pressure regardless of landing conditions.

Although the present invention has been illustrated and described in connection with a certain selected example embodiment of the invention, it will be understood that this is illustrative of the invention and is by no means restrictive thereof. It is reasonably to be expected that those skilled in this art can make numerous revisions and adaptations of the invention to suit individual design requirements and it is intended that such revisions and adaptations of the invention will be included within the scope of the following claims as equivalents of the invention.

Having now described our invention, what we claim is:

1. A fluid pressure operated braking system comprising a brake-applying mechanism, means for supplying a substantially unrestricted flow of pressurized fluid to said brake-applying mechanism, an anti-skid device for releasing fluid pressure from said brake applying mechanism, means forming a restriction for restricting the flow of fluid to said brake-applying mechanism, and valve means for interrupting such unrestricted flow of fluid to said brake-applying mechanism, said valve means being operatively connected to said anti-skid device and operable thereby to interrupt such unrestricted flow immediately upon operation of said anti-skid device and thereafter to divert the flow of fluid through said restriction means to said brake-applying mechanism whereby upon operation of said anti-skid device ceasing its release of fluid from the brake-applying mechanism, reapplication of the brake is effected by such restricted flow of fluid, said restriction means includes means forming a variable resistance to flow in accordance with the pressure of fluid established by said brake-applying mechanism before its operation by said anti-skid, said restriction means effecting relatively great restriction at low pressures and correspondingly less restriction at higher pressures.

2. A braking system according to claim 1 wherein said restriction means comprises a cylinder having a piston mounted for slidable movement therein, and said variable resistance means includes means forming a helically extending groove between said piston and cylinder to provide a flow of fluid to said brake-applying mechanism and adapted to receive a flow of fluid therethrough as a diverted flow of said valve means, means forming an inlet on said cylinder in the form of an annular recess in the wall thereof for communication with said helical groove, and operatively connected to a supply of pressurized fluid, whereby the position of said piston in said cylinder determines the length of groove through which the flow of fluid is diverted.

3. A braking system according to claim 2 including a spring adapted to act against said piston and biasing it to a position offering maximum restriction to fluid flow through said helical groove, said piston being also exposed to the brake-applying pressure tending to position said piston in opposition to said spring and toward a position reducing the resistance to the flow of fluid through said helical groove.

4. A braking system according to claim 3 including a second inlet means of said cylinder providing said unrestricted flow of fluid adapted to pass from said valve means into the interior of said cylinder and said piston, means forming an aperture on said piston through which said unrestricted flow of fluid is adapted to pass directly to said brake-applying mechanism, and means for reducing the effective area of said piston at its end remote from the end exposed to said brake-applying mechanism.

5. A braking system according to claim 4 wherein said helical groove is formed in the wall of said piston and is in communication with the brake-applying mechanism during brake operation.

6. A braking system according to claim 5 including means forming a second helical groove in the wall of said piston, said second groove extending from the piston crown and disposed between the convolutions of said first helical groove for a portion of the length thereof.

7. A fluid pressure operated braking system comprising a brake-applying mechanism, means for supplying a substantially unrestricted flow of pressurized fluid to said brake-applying mechanism, an anti-skid device for releasing fluid from said brake-applying mechanism, and valve means for interrupting such substantially unrestricted fluid flow to said brake-applying mechanism, said valve means including a valve member movable between a seated and an unseated position, and a valve seat for said valve member adapted in combination with said valve member to interrupt the unrestricted flow of fluid to said brake-applying mechanism, said valve member being urged away from said valve seat, and spring means operable by the pressure of fluid released from said brake applying mechanism to provide for moving said valve member toward its associated valve seat, said valve means being operatively connected to said anti-skid device and operable thereby to interrupt the substantially unrestricted flow immediately upon operation of said anti-skid device, and means for thereafter providing a restricted flow of fluid to said brake-applying mechanism whereby upon reapplication, said brake-applying mechanism receives the pressure from said restricted flow of fluid as said anti-skid device terminates its fluid-pressure releasing operation.

8. A braking system according to claim 7 wherein said valve means operable by the pressure and fluid released from said brake-applying mechanism comprises a valve disc fluid tightly slidable in a chamber connected to said anti-skid device.

9. A braking mechanism according to claim 8 wherein the head of said valve member is communicated with said supply of pressurized fluid and is movable thereby and a valve seat engageable by said valve member and adapted for controlling the passage of fluid to said unrestricted passage, said valve member having a tail portion which is operatively communicated with said exhaust whereby said valve is subjected to a differential fluid pressure tending to urge said valve member toward its sealed position on said valve seat.

10. A braking system according to claim 9 including a restricted flow passage means adapted to exhaust leakage fluid when said valve member is in its unsealed position, said restricted flow passage means including a valve means forming an exhaust outlet and a spring loaded plunger adapted to close said valve means and prevent exhaust of fluid through said outlet.

References Cited by the Examiner
UNITED STATES PATENTS

| | | | |
|---|---|---|---|
| 2,198,030 | 4/1940 | Farmer | 303—21 |
| 2,997,059 | 8/1961 | Mortimer | 303—24 |

EUGENE G. BOTZ, *Primary Examiner.*